Feb. 26, 1952

G. W. JACKSON 2,587,163

WINDSHIELD WIPER DRIVE

Filed Jan. 13, 1951

INVENTOR
GEORGE W. JACKSON

BY Willits, Hardman and John
HIS ATTORNEYS

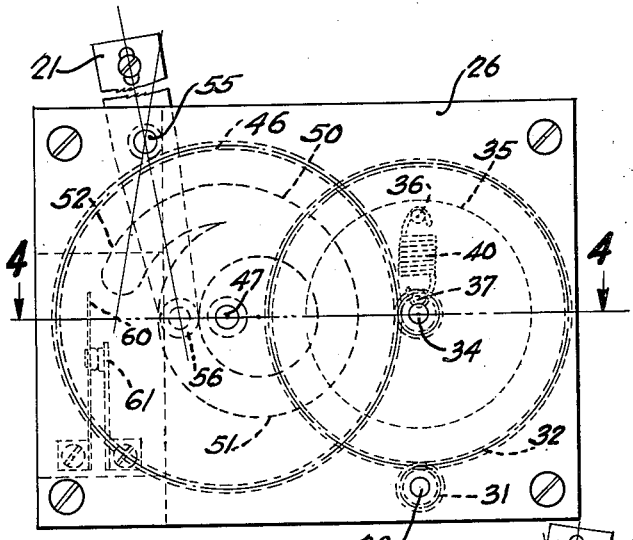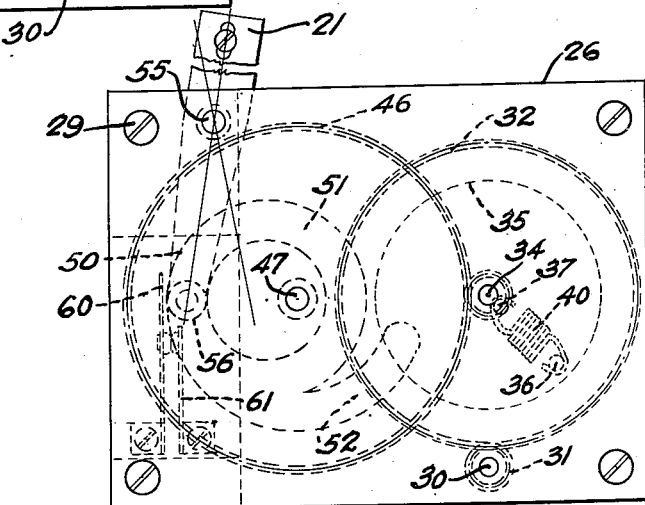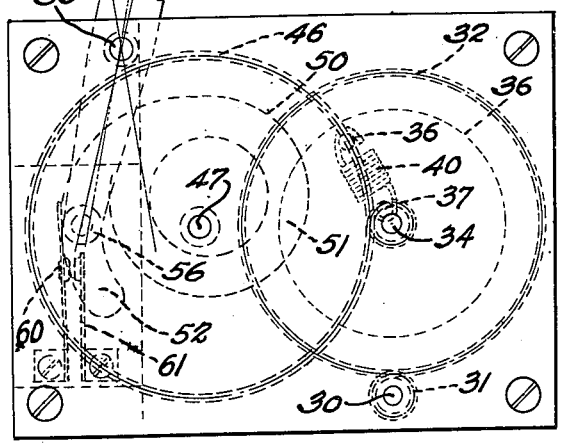

Patented Feb. 26, 1952

2,587,163

UNITED STATES PATENT OFFICE 2,587,163

WINDSHIELD WIPER DRIVE

George W. Jackson, Dayton, Ohio, assignor to General Motors Corporation, Detroit, Mich., a corporation of Delaware Application January 13, 1951, Serial No. 205,913

8 Claims. (Cl. 74—54)

This invention relates to an improved mechanism for oscillating a windshield wiper drive.

It is among the objects of the present invention to provide a simple and improved windshield wiper oscillating mechanism driven by a reversible electric motor, said mechanism being operative in one direction constantly to oscillate the wiper blade through its normal range of operation and in the opposite direction to move the blade into a parked position at a point beyond one end of said normal range of operation at which time the electric motor is automatically rendered inactive.

A further object of the present invention is to provide a windshield wiper oscillating mechanism which, after moving the wiper blade into its parked position and having its driving motor deenergized and rendered inactive, permits the motor to drive the mechanism while coasting to a stop without moving the blade beyond the parked position or suddenly stopping the motor.

A still further object of the present invention is to provide a windshield wiper oscillating mechanism with reversible speed reducing gearing in which the driving group of gears is operatively connected to another or the driven group by a yieldable connection operative at normal loads to maintain normal driving connections in either direction between said groups of gears but being releasable to permit operation of the driving group of gears in either direction relatively to the driven group of gears when the load on the latter exceeds a predetermined value.

Further objects and advantages of the present invention will be apparent from the following description, reference being had to the accompanying drawings wherein a preferred embodiment of the present invention is clearly shown.

In the drawings:

Fig. 5 is a front view of the actuator mechanisms in one position.

Fig. 6 is a view similar to Fig. 5 showing the mechanism in another position.

Fig. 7 is a similar view showing the mechanism in the wiper blade parking position.

The actuator of the present invention is driven by an electric motor 20 adapted to rotate in either direction. This actuator translates the rotary motion of the motor into oscillatory motion whereby the lever 21, connectible to a windshield wiper in any suitable manner, is oscillated to move the windshield wiper blade back and forth.

Figure 1:
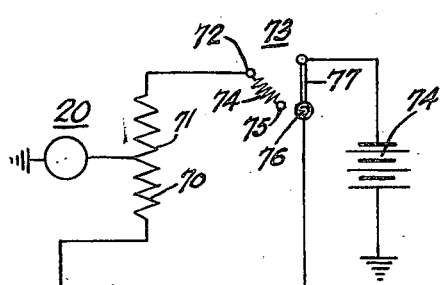
Fig. 1 is a fragmentary view of an automobile windshield equipped with the present invention.
Figure 1:
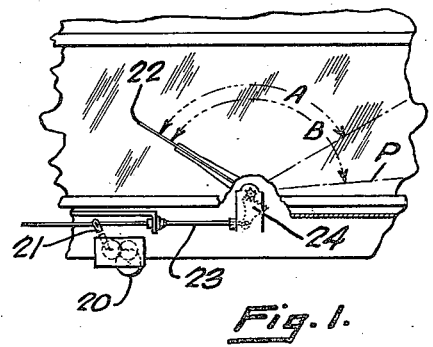

The Figure 1 of the drawings illustrates a fragment of an automobile windshield equipped with the present invention. This figure shows the apparatus of the present invention connected with the windshield wiper blade 22 through a link connection 23 and suitable gearing 24. As the lever 21 is oscillated by the actuator it reciprocates the link 23 which through gearing 24 oscillates the windshield wiper 22 to clean the windshield.

The actuator of the present invention consists of a housing formed by two plates 26 and 27 held in parallel spaced relation by spacer posts 28 through which bolts 29 extend. A shaft 30 is rotatably supported by the plates 26 and 27, this shaft having a pinion 31 attached thereto between plates 26 and 27 so that the pinion rotates with the shaft. Any suitable reversible electric motor 20 is operatively connected with shaft 30. The pinion 31 meshes with a gear 32 which has a hub 33 provided with a central opening in which a stub shaft 34 is journaled. The hub 30 of gear 32 is rotatably supported in an opening in the plate 27 of the frame. Hub 30 of gear 32 has a plate 35 in the form of a disc secured thereto. This plate 35 supports a stud or pin 36 adjacent its outer peripheral edge, an annular groove being provided in said pin adjacent its outer end.

The stub shaft 34, rotatably supported in the central opening in the hub 33 of gear 32, has an eccentric arm portion 37 at the end thereof said arm also having an annular groove.

The stub shaft 34 provides a crank arm in the form of the eccentric portion 37 on said stub shaft. Between the crank arm 37 of stub shaft 33 and the pin 36 attached to the disc 34 there is provided a spring 40, the one end loop thereof being mounted about the pin 36 in its annular groove, the opposite end of the spring 40 having a loop which fits about the crank portion 37 of shaft 34 in the annular groove thereof. These end loops of spring 40 may turn relatively to their respective anchorages with the pin 35 and the crank 37. The spring 40 provides the yieldable driving connection between the gear driven disc 35 and the crank shaft 34, being operative to transmit turning movement from the disc 35 to the crank shaft 34 in either direction and also operative to yield and permit relative rotation between the disc and crank shaft if and when said crank shaft 34 is subjected to a load in excess of a predetermined value. If under any circumstances an excess load is applied to the crank shaft 34, then the disc 35 may rotate relatively to the crank shaft 34, this relative rotation merely resulting in an expansion and contraction of the spring 40 as the pin 36 is revolved about the eccentric end 37 of the crank shaft 34. However, as long as the load upon the crank shaft 34 remains within a predetermined limit rotation of the disc 35 will cause the spring 40, which is of a predetermined tension, to move the crank shaft to rotate with the disc 35, and the axis of the spring under these circumstances remaining in alignment with the center of the crank portion 37 and the center of the crank shaft 34.

The crank shaft 34 has a pinion 45 secured thereto so as to rotate therewith, this pinion 45 operatively meshing with a gear 46 supported upon a stub shaft 47 mounted between the plates 26 and 27. The side of the gear 46 adjacent gear 32 has a camming channel or groove 50 provided therein, this groove being shaped like a figure 6. The main or loop portion of this camming groove designated by the numeral 51 is circular, being eccentric to the shaft 47 which supports the gear 46. Communicating with this circular portion 51 of the camming groove 50 and diverging outwardly therefrom is an arcuate tail or branch portion 52. The branch channel or more particularly the part thereof leading from the circular portion 51 of the camming groove is of a predetermined curvature diverging from the said circular portion 51 of the camming groove, the trailing or end portion of the branch 52 being substantially concentric with the shaft 47 supporting the gear 46. The purpose of this feature will be described detailedly hereinafter.

The lever 21, oscillated by the mechanism driven by the electric motor 20, is pivoted to the frame by the pin 55. As mentioned heretofore one end of lever 21 is operatively attached to a link connection 23 which is reciprocated by the oscillation of the lever 21 to actuate suitable gearing 24 for oscillating the windshield wiper 22. The opposite end of lever 21, extending into the space between plates 26 and 27, has a cam follower in the form of a roller 56 rotatably secured thereto, said cam follower or roller extending into the camming groove 50 formed in the gear 46. Referring to the Figs. 5, 6 and 7 it will be seen that as the gear 46 is rotated counterclockwise the cam follower 56 on lever 21 will traverse only the circular portion 51 of the camming groove 50 and will not enter the branch or tail portion 52. As the cam follower 56 traverses the circular portion 51 of the cam groove 50, which portion is eccentric to the shaft 47 supporting gear 46, lever 21 will be oscillated and the wiper blade actuated within the normal range designated by the letter A in Fig. 7 as long as the motor is driving the apparatus in this direction. However, when the rotation of the electric motor 20 is reversed so that it rotates gear 46 in a clockwise direction, then, the open end of the tail or branch portion 52, as it approaches the cam follower 56 on lever 21 will be entered and traversed said cam follower thereby causing the lever to be actuated to a point beyond the one end of the normal range of movement. Fig. 7 illustrates the cam follower 56 within the branch or tail portion 52 of the camming groove 50 and in this position of the follower the lever 21 will have been actuated through a range of movement indicated by the letter B. In moving through the angular range of movement B, the windshield wiper 22 as shown in Fig. 1 is actuated into its parking position P. When the cam follower 56 is moved into the position as shown in Fig. 7, that is, into a predetermined position within the deviating tail or branch portion 52 of the camming groove 50, the lever 21 will engage the contact 60 which, as shown in Fig. 5, normally engages its cooperating contact 61. Both these contacts are insulatingly mounted upon the plate 27 of the actuator.

Figure 4:
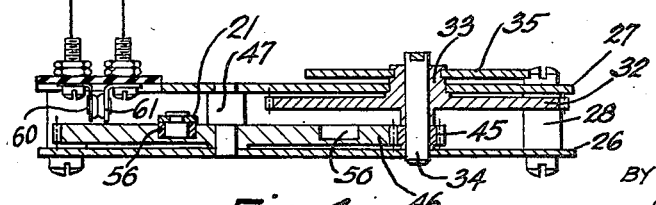
Fig. 4 is a sectional view taken substantially along the line and in the direction of the arrows 4—4 in Fig. 5. The electrical circuits have been added to this figure.

The Fig. 4 shows a diagrammatic view of the electrical elements and connections associated with this mechanism. The motor 20 has two field windings 70, 71, the one, when energized, causing the motor to operate in one direction, the other, when energized, causing the motor to operate in the opposite direction. Winding 70 is connected to the contact 60 while winding 71 is connected to one terminal 72 of a control switch 73. Terminal 72 has one end of a rheostat resistance 74 connected thereto, the other end of this resistance being connected to a terminal 75 engageable by the movable contact 77 of the switch 73. Contact 61 in the actuator is connected with the other stationary contact 76 of the control switch 73, the movable contact arm 77 of said control switch being connected with the source of current or storage battery 74 which is grounded. According to the diagram, when the windshield wiper 22 is to be operated continually through its normal range of movement designated by letter A, in Fig. 1, movable contact 77 of switch 73 is moved into engagement with the contact 75 so that current from the battery 74 will flow through the movable contact 77 to terminal 75 thence through the rheostat 74 to terminal 72 and through the field winding 71 of the motor 20, causing the motor 20 to rotate so that through its speed reducing gearing the gear 46 is rotated in a counterclockwise direction as regards Figs. 5, 6 and 7 and a clockwise direction as regards Fig. 2. With the resistance 74 in circuit, the windshield wiper actuator mechanism will operate at its slowest speed. However, if the fastest speed is desired then the movable contact 77 is shifted into engagement with terminal 72 of the switch, whereby the resistance in the circuit is eliminated.

Figure 3:
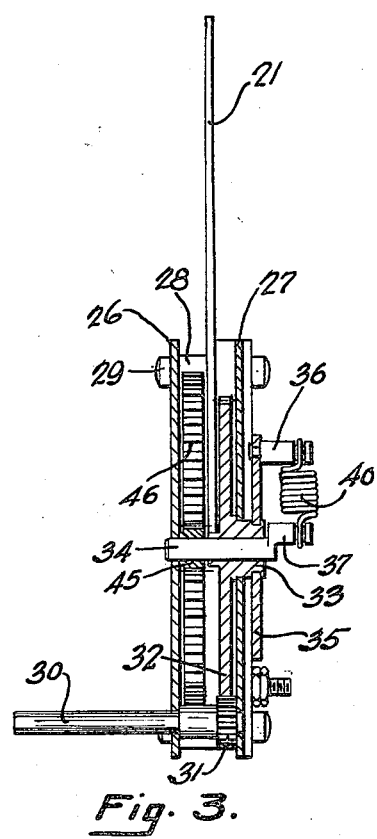
Fig. 3 is a side view, partly in section of the mechanism shown in Fig. 2.
Figure 2:
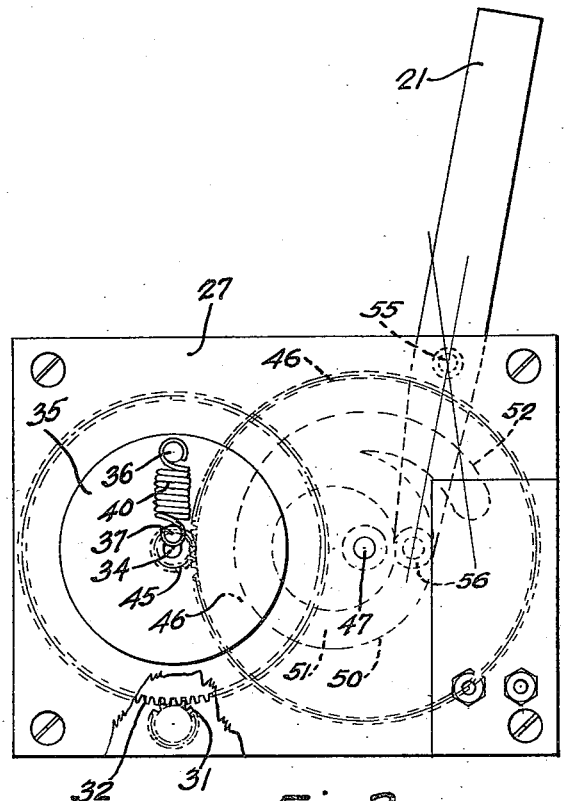
Fig. 2 is a rear view of the actuator mechanism.

When it is desired to stop operation of the windshield wiper, the movable contacts 77 of switch 73 is moved into engagement with the terminal 76 as shown in Fig. 4, at which time current from the battery will flow to the contact 61 in the actuator thence to the engaging contact 60, field winding 70 of the electric motor 20, resulting in a reversal of the electric motor so that it will now drive the speed reducing gearing to rotate the gear 46 thereof in a clockwise direction as regards Figs. 5, 6 and 7 or counterclockwise as regards Fig. 2. As a result of this directional rotation of gear 46, the cam follower 56 will enter the tail or branch position 52 of the camming groove 50 thereby moving the lever 21 into the extreme position as shown in Fig. 7 in which said lever engages contact 60 actuating it to break its engagement with the cooperating contact 61 and thus discontinue the electric circuit through the field winding 70 of the electric motor thereby rendering said motor deenergized or inactive. In the position as shown in Fig. 7, with the cam follower 56 at a predetermined position in the deviating tail or branch portion 52 of the camming groove 50, the lever 21 will have been moved so as to actuate the windshield wiper 22 through the range indicated by the letter B in Fig. 1 into its parking position designated by the letter P.

When the current flow through the field winding 70 of the electric motor 20 is discontinued, the motor is deenergized. However, due to inertia it will not immediately stop but will continue to decelerate and coast to a full stop. While coasting to a stop the motor still will rotate the gear 46 so that the tail portion 52 of the camming groove 50 will move relatively to the cam follower 56. In order that during this coasting period rotation of the gear 46 in a clockwise direction will not move the windshield wiper blade 22 beyond its parking position designated by the letter P in Fig. 1, the portion of the tail or branch 52 of the camming groove extending beyond the point at which the motor circuit is broken, as shown in Fig. 7, is made concentric of the gear 46. Thus during the rotation of the gear 46 from the time the motor circuit is broken until the time at which the coasting motor actually stops rotation, consequent rotation of gear 46 will not effect any oscillatory movement of the lever 21. It will, of course, be understood that the part of the tail or branch portion 52 from the point occupied by the cam follower as indicated in Fig. 7 to its communicating entrance at the circular portion 51 of the cam groove 50 is of predetermined angularity relatively to the axis of the gear 46 so that clockwise rotation thereof will result in clockwise oscillation of the lever 21 about its pivotal pin 55 as regards Figs. 5, 6 and 7.

From the aforegoing description it will be seen that the present invention provides a simple and positive actuator for a windshield wiper blade operative to actuate said windshield wiper blade throughout a predetermined range of movement for normal operation and operative to move said windshield wiper blade into a parking position beyond one end of the normal range of said blade.

The present improved windshield wiper actuating mechanism is provided with a reversible and releasable driving connection adapted at predetermined loads to drive the speed reducing gearing in either direction, said releasable connection being operative also when said predetermined load is exceeded to yield and permit relative rotation of movement transmitting elements of the device whereby any damage which might result from overload is entirely prevented.

Another feature of the present invention resides in the provision of a structure which permits the electric motor while coasting from the time of deenergization to the time of complete stopping of the motor without causing movement of the windshield wiper beyond its predetermined parking position and completely avoiding sudden stalling of the electric motor thereby eleminating the possibility of damage to any of the working parts of the apparatus.

While the embodiment of the present invention as herein disclosed, constitutes a preferred form, it is to be understood that other forms might be adopted.

What is claimed is as follows:

1. An actuator for oscillating a windshield wiper blade, comprising in combination, a prime mover; a member rotated in either direction by said prime mover; a channel in one side of said member, said channel consisting of a circular portion eccentric of said member and an outwardly diverging tail portion of predetermined length and angularity; a pivoted lever one end of which is connectible with the wiper blade, the other end of said lever having a follower extending into said channel, the follower continuously traversing only the circular portion of the channel as the member is rotated in one direction and being capable of entering the tail portion as the member is rotated in the opposite direction; means operative to render the prime mover continuously active in one direction and to prevent continuous operation of the prime mover in the opposite direction, said means being engageable by the follower when moving into the tail portion of the channel for rendering the prime mover inactive.

2. An actuator for oscillating a windshield wiper blade, comprising in combination, a prime mover; a gear rotated in either direction by said prime mover; control means normally rendering the prime mover operative; a channel in the gear, shaped like the figure 6, the closed loop portion thereof being circular and eccentric to the gear, the diverging arcuate tail portion of the channel being of predetermined length and curvature; a pivoted lever one end of which is connectible to the wiper blade; a follower secured to the other end of the lever and extending into the said channel, said follower traversing only the circular portion of the channel as the gear is rotated in one direction and being operative to move from said circular portion into the diverging tail portion and engage the control means to render the prime mover inoperative as the gear is rotated in the opposite direction.

3. An actuator for oscillating a windshield wiper blade, comprising in combination, an electric motor; a pair of normally closed contacts in circuit with the motor; a gear rotated by the motor in either direction; a cam provided on one side of said gear said cam consisting of a circular portion eccentric of the gear and an arcuate, communicating tail portion diverging outwardly from said circular portion; a pivoted lever one end of which is connectible with the wiper blade; a cam follower on the other end of said lever and operatively engaging the cam, said follower traversing only the circular portion of the cam as the gear rotates in one direction, for reciprocating the wiper blade throughout a predetermined range, reverse rotation of the gear causing the follower to pass from the circular portion of the cam to the diverging tail portion of said cam for moving the wiper blade into a position beyond one end limit of its predetermined range of movement, at which time the lever engages and actuates one contact to disengage it from the other of said pair of contacts for rendering the motor inoperative.

4. An actuator for oscillating a windshield wiper blade, comprising in combination, an electric motor; a train of speed reducing gearing driven in either direction by said motor, a cam groove in the one side of the slowest rotating gear, said cam groove consisting of a substantially circular portion eccentric of the gear and a communicating tail portion diverging outwardly from said circular portion at progressively varying angularity and of predetermined length; a wiper blade operating lever pivoted intermediate its ends; a cam follower carried at one end of said lever, said follower extending into the cam groove and operative to traverse only the circular portion of said groove as the grooved gear is rotated in one direction and to move from said circular portion and enter the tail portion of the groove as said gear is rotated in the opposite direction; two contacts in the motor circuit yieldably urged to engage, one contact being engaged and separated from the other by the said lever to render the motor inoperative when said lever has entered the tail portion of the groove a predetermined distance.

5. An actuator for oscillating a windshield wiper blade, comprising in combination, a frame; a power driven pinion rotatably supported in the frame; a gear rotatably carried by the frame and meshing with the pinion; said gear having a hollow hub; a disc secured to the gear; a shaft journalled in the hub of the gear and having an eccentric portion at its end adjacent the disc, said eccentric portion providing a crank arm; a pin extending from the disc adjacent its peripheral edge; a tension spring secured between the pin and crank arm, the end loops of said spring fitting about the pin and crank arm respectively so as to be capable of rotation relatively thereto; a pinion secured to the shaft so as to rotate therewith; a gear supported in the frame and meshing with said last mentioned pinion; a camming channel in the one face of said last mentioned gear, said channel having a circular portion eccentric to said gear, and a communicating, outwardly extending arcuate tail portion; normally engaged contacts insulatingly carried in the frame; a lever pivoted to the frame, one end of the lever being attachable to the wiper blade, the other end having a cam follower which, while traversing only the circular portion of the camming channel as the channelled gear rotates in one direction, reciprocates the lever through a predetermined range of movement and as said channelled gear rotates in the opposite direction, leaves the circular channel portion and enters the diverging arcuate tail portion for moving the lever beyond the limit of said predetermined range of movement in one direction and for rendering the lever operative to engage and open said contacts.

6. An actuator for a windshield wiper blade, comprising in combination, a frame; two pairs of speed reducing gears; a two-way yieldable connection between said pairs of gears, operative to cause the one pair of gears to drive the other pair of gears in one direction or the other as long as the resistance to being driven by said other pair of gears remains within predetermined limits which, if exceeded, causes the yieldable connection to overrun and operate idly as the driving pair of gears continue to rotate; a motor for rotating the driving pair of gears in either direction; a pivoted lever operatively connected to the driven pair of gears which, when rotating in one direction continually reciprocate the lever through a predetermined arc of movement and when rotating in the opposite direction actuate the lever into a predetermined position beyond one end of said arc of movement; and means, actuated by said lever when moved beyond said predetermined arc of movement in said opposite direction, for rendering the driving motor inactive.

7. An actuator for oscillating a windshield wiper blade through a normal range of operation and also into a parked position beyond one end of said normal range, said actuator comprising in combination; a pivoted oscillator connectible to the wiper blade; speed reducing gearing driven in either direction by a prime mover; a camming groove in the slowest moving gear of said gearing said groove consisting of a circular portion eccentric of said gear and an outwardly extending branch portion; a cam follower on the oscillator and extending into the camming groove, operative when the channelled gear is rotating in one direction to oscillate the wiper through its normal range of movement and when the said channelled gear is rotating in the opposite direction to enter the branch portion of the channel and actuate the oscillator for moving the blade into its parked position; and means engaged by the oscillator and actuated thereby to render the prime mover inactive when said oscillator moves the wiper blade into said parked position, the branch portion of the camming groove being sufficiently long to permit movement of the follower therein while the prime mover is coasting to a standstill after being rendered inactive.

8. An actuator for oscillating a windshield wiper blade, comprising in combination, an electric motor; a pinion and a meshing gear driven by the motor in either direction; a second, separate meshing pinion and gear; a yieldable connection between the first mentioned gear and the second pinion, said connection being operative to maintain driving connection between said first mentioned gear and the second pinion in either direction while the load on said second pinion is of a predetermined value, the connection yielding and permitting rotation of said first mentioned gear relatively to the second pinion in either direction when said predetermined load on said second pinion is exceeded; a pivoted lever connectible with the wiper blade; means in the second gear, engaged by the lever, said means being operative as said second gear rotates in one direction, to oscillate the lever through a normal range, and as said second gear rotates in the opposite direction to move the lever to a point beyond one end of its range of movement; and means engaged by the lever when at said point for rendering the motor inactive.

GEORGE W. JACKSON.

No references cited.